(12) United States Patent
Forster et al.

(10) Patent No.: US 10,598,217 B2
(45) Date of Patent: Mar. 24, 2020

(54) ANGULAR CONTACT BALL BEARING AND TRANSMISSION ASSEMBLY

(71) Applicant: Aktiebolaget SKF, Gothenburg (SE)

(72) Inventors: Thomas Forster, Waidhofen/Ybbs (AT); Rudolf Hauleitner, Steyr (AT)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/522,745

(22) Filed: Jul. 26, 2019

(65) Prior Publication Data
US 2019/0345977 A1 Nov. 14, 2019

Related U.S. Application Data

(63) Continuation of application No. 15/724,742, filed on Oct. 4, 2017.

(30) Foreign Application Priority Data

Oct. 10, 2016 (DE) .................. 10 2016 219 647

(51) Int. Cl.
*F16C 19/16* (2006.01)
*F16C 33/38* (2006.01)
*F16C 33/58* (2006.01)

(52) U.S. Cl.
CPC ............ *F16C 19/163* (2013.01); *F16C 33/38* (2013.01); *F16C 33/58* (2013.01); *F16C 2326/06* (2013.01)

(58) Field of Classification Search
CPC ...... F16C 19/163; F16C 33/58; F16C 33/585; F16C 2240/40
See application file for complete search history.

(56) References Cited

U.S. PATENT DOCUMENTS

| 3,292,980 A * | 12/1966 | Gustafsson | F16C 19/06 384/516 |
| 6,428,214 B2 * | 8/2002 | Tajima | B60B 27/00 29/898.063 |
| 7,186,029 B2 * | 3/2007 | Takei | C10M 115/08 384/450 |
| 7,249,892 B2 * | 7/2007 | Takemura | F16C 19/06 384/450 |

(Continued)

FOREIGN PATENT DOCUMENTS

| DE | 2132891 A1 * | 1/1973 | ............ B60K 17/16 |
| EP | 1291557 A2 * | 3/2003 | ............ B60K 17/22 |
| JP | 2005061508 A * | 3/2005 | |

*Primary Examiner* — Thomas R Hannon
(74) *Attorney, Agent, or Firm* — Garcia-Zamor Intellectual Property Law; Ruy Garcia-Zamor; Bryan Peckjian

(57) ABSTRACT

An angular contact ball bearing includes an outer ring having an outer diameter D and a first rolling surface and an inner ring having an inner diameter d and a second rolling surface, and no more than one row of balls between the first rolling surface and the second rolling surface, each of the balls having a diameter $D_w$. The diameter $D_w$ of the balls, the outer diameter D of the outer ring, and the inner diameter d of the inner ring satisfy the relationship:

$$D_w > 0.7 * \frac{(D-d)}{2}.$$

16 Claims, 3 Drawing Sheets

(56) References Cited

U.S. PATENT DOCUMENTS

| | | | | |
|---|---|---|---|---|
| 7,648,283 | B2 * | 1/2010 | Komori | B60B 3/02 |
| | | | | 384/506 |
| 8,512,193 | B1 * | 8/2013 | Hilker | F16H 48/38 |
| | | | | 475/160 |
| 9,360,046 | B2 * | 6/2016 | Okamoto | F16C 19/541 |
| 2006/0088235 | A1 * | 4/2006 | Ueda | C10M 115/08 |
| | | | | 384/462 |
| 2008/0193072 | A1 * | 8/2008 | Hattori | B25J 9/108 |
| | | | | 384/571 |
| 2009/0080825 | A1 * | 3/2009 | Koda | F16C 19/163 |
| | | | | 384/572 |
| 2010/0183256 | A1 * | 7/2010 | Kimura | F16C 19/163 |
| | | | | 384/523 |
| 2018/0223899 | A1 * | 8/2018 | Tanimura | F16C 19/163 |

* cited by examiner

ANGULAR CONTACT BALL BEARING AND TRANSMISSION ASSEMBLY

CROSS-REFERENCE

This application is a Continuation of U.S. application Ser. No. 15/724,742 filed on Oct. 4, 2017, which claims priority to German patent application no. 10 2016 219 647.2 filed on Oct. 10, 2016, the contents of which are both fully incorporated herein by reference.

TECHNOLOGICAL FIELD

The disclosure relates to an angular contact ball bearing including an outer ring including a first rolling surface and an inner ring including a second rolling surface, between which exactly one row of balls is disposed. The disclosure further relates to a transmission assembly for a motor vehicle, including a shaft that includes a gear element and is rotatably supported in a housing via at least two axially spaced, single row rolling-element bearings.

BACKGROUND

Transmission assemblies are used in motor vehicles, for example, in drivelines, in order to mechanically connect a shaft driven by the motor of the motor vehicle to the to-be-driven wheels and accordingly transmit the force. In known transmission assemblies tapered roller bearings are normally used for supporting the shaft, which tapered roller bearings are designed to support relatively high axial and radial loads. The shaft is then, for example, supported via two axially spaced tapered roller bearings that are typically disposed in back-to-back arrangement in the transmission housing. The tapered roller bearings are axially preloaded.

The friction losses caused by the tapered roller bearings are disadvantageous in such transmission assemblies. In the construction of motor vehicles the reduction of friction is generally desired for avoiding and minimizing emissions, and thus a goal of the further development of components. Thus transmission assemblies are already known wherein two double row angular contact ball bearings are used instead of the tapered roller bearings. This basically has the advantage of reduced friction; however, the manufacture of the corresponding bearing is relatively expensive.

SUMMARY

It is an aspect of the present disclosure to specify a highly loadable angular contact ball bearing that is suited in particular for use in transmission assemblies in which tapered roller bearings or double row angular contact ball bearings are otherwise used. It is further an aspect of the disclosure to specify a corresponding transmission assembly.

According to the disclosure, in one aspect, an angular contact ball comprises: an outer rolled-on element (or outer ring) including a first rolling surface, an inner rolled-on element (or inner ring) including a second rolling surface, exactly one row of balls is disposed between the rings, the diameter $D_w$ of the balls, the outer diameter $D$ of the outer ring, and the inner diameter $d$ of the inner ring are selected such that they have the relationship $$\frac{2D_w}{D-d} > 0.7$$

to one another.

In other words for the diameter $D_w$ of the balls $$D_w > 0.7 \cdot \frac{(D-d)}{2}$$

applies.

The diameter of the balls is at least 70% of a radial height of the angular contact ball bearing when the radial height is defined as half of the difference of the outer diameter of the outer ring and of the inner diameter of the inner ring. Thus the ball assumes a correspondingly large volume fraction in the angular contact ball bearing.

The disclosure decisively emanates from the recognition that with appropriate adapting, modern angular contact ball bearings can also be used for situations having high load ratios. To date it has been assumed that in particular single row angular contact ball bearings can only be used for relatively low axial and radial loads. Often such angular contact ball bearings have also been combined with a radial bearing, for example, in the form of a cylindrical roller bearing, in order to also be able to support higher radial loads in the common assembly. Alternatively multi-row angular contact ball bearings or tapered roller bearings have been used to date in situations that require a high load rating. Due to the specific size ratios, prescribed in the context of the disclosure, of the outer diameter of the outer ring and of the inner diameter of the inner ring in relation to the diameter of the balls, single row angular contact ball bearings can be manufactured that are also usable for more-highly-loaded situations. The usual specification of angular contact ball bearings is thereby deliberately abandoned by only relatively thin-walled rings being provided in comparison to the relatively large ball diameter.

In one advantageous design of the disclosure the angular contact ball bearing further has the following features:

the outer ring includes a radially inwardly directed shoulder of a minimum diameter $D_1$, whose ratio to an inner diameter $D_2$ of the raceway base of the first rolling surface falls between 0.85 and 0.91, and/or the inner ring includes a radially outwardly directed shoulder of a maximum diameter $d_1$, whose reciprocal ratio to the outer diameter $d_2$ of the raceway base of the second rolling surface falls between 0.79 and 0.85.

In angular contact ball bearings the shoulders on the ring contribute significantly to the rolling surface so that axial loads can also be supported. Due to the relatively high shoulders chosen here, in comparison to known angular contact ball bearings, on the inner and outer ring an overall significantly wider rolling surface arises for the balls. The load rating of the angular contact ball bearing can thereby increase further in an advantageous manner, with the result that the angular contact ball bearing can be used in more-highly-loaded situations.

In one advantageous design of the disclosure a minimum axial width of the shoulder of the inner ring is embodied wider than a minimum axial width of the shoulder of the outer ring. Especially with large-diameter balls a particularly stable angular contact ball bearing having optimized load distribution thereby arises. Due to its increased stability the wider shoulder on the inner ring reliably supports load peaks.

In one advantageous design of the disclosure the angular contact ball bearing includes a number Z of balls according to $$Z = \left(\frac{180}{\arcsin\frac{D_w}{D_{pW}}}\right) - 1$$

between the rings, wherein $D_{pW}$ indicates the pitch circle diameter and Z is rounded to a whole number. The more balls are provided in the bearing, the smaller the diameter is to be chosen. Thus in the case of nine balls $D_w$ is approximately 31% of $D_{pW}$, in the case of ten balls, however, approximately 28%. In comparison to known angular contact ball bearings it is a high number of balls here, due to which the load rating of the angular contact ball bearing can increase further.

In one advantageous design of the disclosure a pressure angle of the balls with respect to the rolling surfaces falls between 15° and 35°. This pressure angle range permits an optimal mixture of axial and radial loadability, as can occur in particular in applications in the automotive field. A contact angle of 25° is particularly preferred, wherein an optimal loadability is present.

In one advantageous embodiment of the disclosure a cage is provided for guiding the balls. On the second rolling surface the inner ring includes an elevation directed radially outward and axially opposite the shoulder, which elevation is configured to cooperate with the shoulder and the cage such that the balls are held on the inner ring in a self-retaining manner. In numerous installation situations it is required to install the outer ring separate from the inner ring and only to join together the angular contact ball bearing with joining together of the entire structural unit. Due to the captive retaining of the balls on the inner ring an easy-to-handle angular contact ball bearing can be provided wherein the outer ring can be added at a later time. The handling of such an assembly is significantly simplified.

Another benefit of the disclosure is also achieved by a transmission assembly for a motor vehicle including a shaft that includes a gear element and is rotatably supported in a housing via at least two axially spaced, single row rolling-element bearings, characterized in that the rolling-element bearing is embodied as an angular contact ball bearing as just described. Such a transmission assembly can be manufactured with the inventive single row angular contact ball bearings in a particularly simple and cost-effective manner. The friction of the bearing points is significantly reduced in comparison to known solutions wherein tapered roller bearings or multi-row angular contact ball bearings are normally used. Moreover, it reacts in a comparatively less sensitive manner to misalignments. With regard to the relatively high loads that occur in such transmission assemblies the inventive single row angular contact ball bearing has no disadvantages.

In one advantageous embodiment of the disclosure both angular contact ball bearings are embodied identically and set in back-to-back arrangement with respect to each other. Such an arrangement of the angular contact ball bearings guarantees an optimal load distribution with typical transmission applications.

Further advantages, features, and details of the disclosure arise from the exemplary embodiments of the disclosure described below with reference to the Figures.

DETAILED DESCRIPTION

Figure 1:
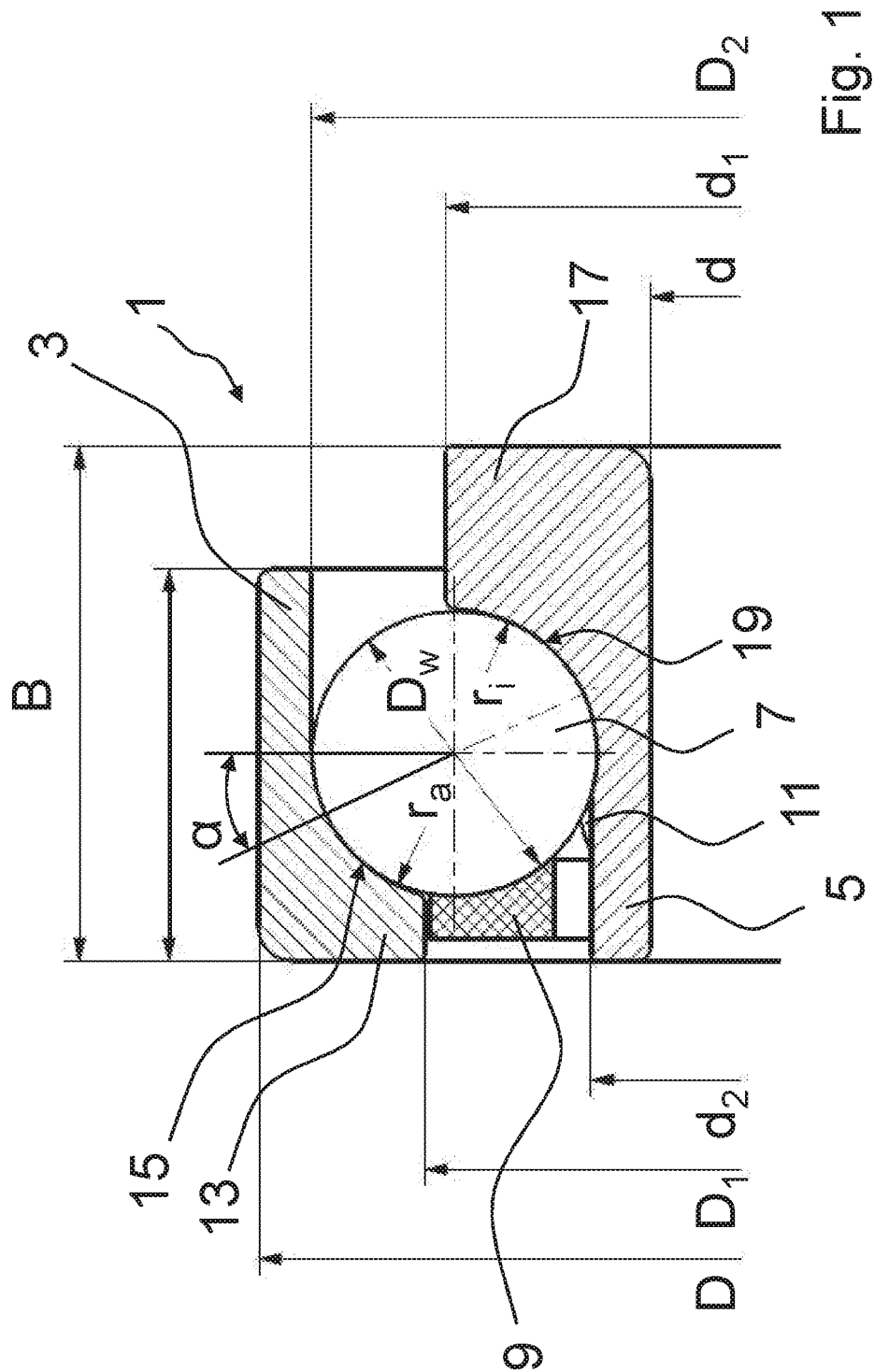
FIG. 1 shows an embodiment of the invention.

In FIG. 1 an angular contact ball bearing 1 according to a preferred embodiment of the disclosure is depicted. The angular contact ball bearing 1 comprises an outer ring 3, an inner ring 5, between which balls 7 are disposed. The balls 7 are retained by a cage 9. On the outer ring 3 a radially inwardly directed shoulder 13 is formed, beginning on whose inner side a raceway 15 is formed for the balls 7. Analogously on inner ring 5 a radially outwardly directed shoulder 17 is formed, beginning on whose inner side a raceway 19 for the balls 7 is formed. The balls 7 osculate on a radius $r_a$ of the raceway 15 and a radius $r_i$ of the raceway 19 in the region of the contact. Here the osculation is selected to be significantly narrower in comparison to angular contact ball bearings of known design, whereby a better compression can be achieved. For further optimization of the compression it is preferably the same size on both raceways 15 and 19, which is thus achieved on outer ring 3 by providing a smaller osculation on the raceway 19, i.e., on the inner ring 5 in comparison to the raceway 15. $r_a > r_i$ consequently applies.

The angular contact ball bearing 1 differs significantly from known angular contact ball bearings with respect to its size ratios. Thus the diameter $D_w$ of the balls, the outer diameter D of the outer rings, and the inner diameter d of the inner rings is chosen such that they have the relationship $$\frac{2D_w}{D-d} > 0.7$$

to one another. Consequently due to their large diameter in comparison to the structural height D−d of the bearing the balls occupy a large part of the installation space. This has the result that at the point that lies radially outside the balls 7 the outer ring 3 is relatively thin. Likewise, the thickness of the inner ring 5 is comparatively thin at the location radially inside the balls 7. Due to the large ball diameter $D_w$ the angular contact ball bearing 1 is able to assume unusually high loads for this bearing type. The load rating is exceptionally high, with the result that it is even suitable for applications for which other bearing types, such as, for example, tapered roller bearings or double row angular contact ball bearings are otherwise used. It has been shown that higher load ratings can be achieved even than with double row angular contact ball bearings of identical outer dimensions (B, D and d). At the same time friction is significantly reduced. This decisively results from a reduced rolling resistance in comparison to the two other bearing types. In addition, the angular contact ball bearing 1 is less sensitive in the case of misalignments.

The outer ring 3 which is thin in places in cross-section includes a shoulder 13 of relatively greater thickness $D-D_1$. The ratio of $D_1$ to the diameter $D_2$ of the raceway base of the first rolling surface falls between 0.85 and 0.91. This increases the stability and the loadability of the angular contact ball bearing 1. The same applies for the inner ring 5 and its shoulder 17, whose radial thickness $d_1-d$ is even greater than $D-D_1$. The reciprocal ratio of $d_1$ to the diameter $d_2$ of the raceway base of the second rolling surface falls between 0.79 and 0.85.

In addition the shoulder 17 is wider than the shoulder 13 with respect to its axial thickness. The dimensioning of the shoulder in the axial direction makes it possible, among other things, to replace existing bearings of another design, e.g., tapered roller bearings or double row angular contact ball bearings, by a single row angular contact ball bearing according to the disclosure and to fill the existing, usually significantly larger-dimensioned installation space.

On the inner ring 5 an elevation 11 is formed axially adjacent to the raceway 17. This serves to form a captive unit from inner ring 5, balls 7, and cage 9, even when the outer ring 3 is not yet present. In numerous situations the manufacturing process of more complex mechanical units requires a separate assembly of outer ring 3 and inner ring 5. Then it is advantageous when the balls 7 and the cage 9 are already captively held in on the inner ring 5 and the assembly is thus simplified.

The balls 7 have a defined pressure angle α with the raceways 13 and 17. The angular contact ball bearing is thus able to support both axially and radially acting forces. The pressure angle α preferably falls between 15° and 35°, ideally at 25°. This has proven to be advantageous in particular for high loads, since the load rating is particularly high in combination with the relatively large balls 7.

Figure 2:
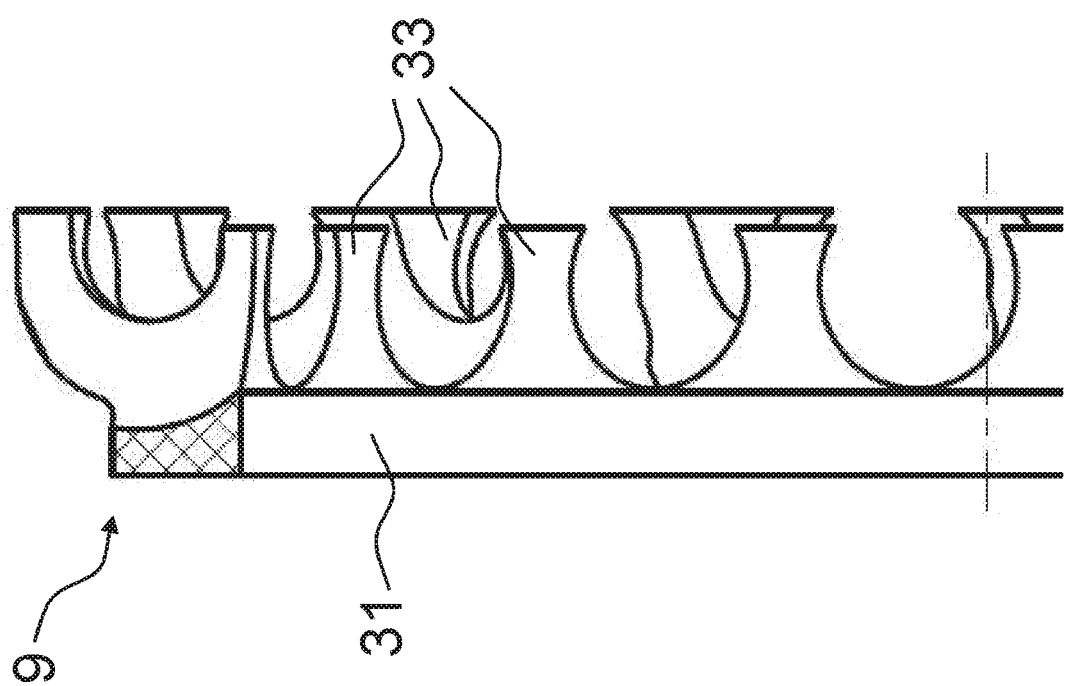
FIG. 2 shows a cage.

The cage 9 guiding and retaining the balls 7 is depicted sectionally in FIG. 2. It is designed such that a relatively high number Z of balls can be used in angular contact ball bearing 1, which in turn leads to an increase of the load rating of the angular contact ball bearing 1. The number Z is defined as follows:

$$Z = \left( \frac{180}{\arcsin \frac{D_W}{D_{pW}}} \right) - 1$$

wherein $D_{pW}$ is the pitch circle diameter of the angular contact ball bearing 1 and Z is rounded to a whole number. If a higher load rating and a greater stiffness is required, then more balls 7 can also be used. Only on its left side the cage 9 includes an annular guide structure 31 on which claw-type extensions 33 extend essentially in the axial direction. A plurality of the extensions 33 respectively form a pocket for receiving a ball of the angular contact ball bearing 1. In a cage 9 configured in this manner relatively many balls 7 can be held.

Figure 3:
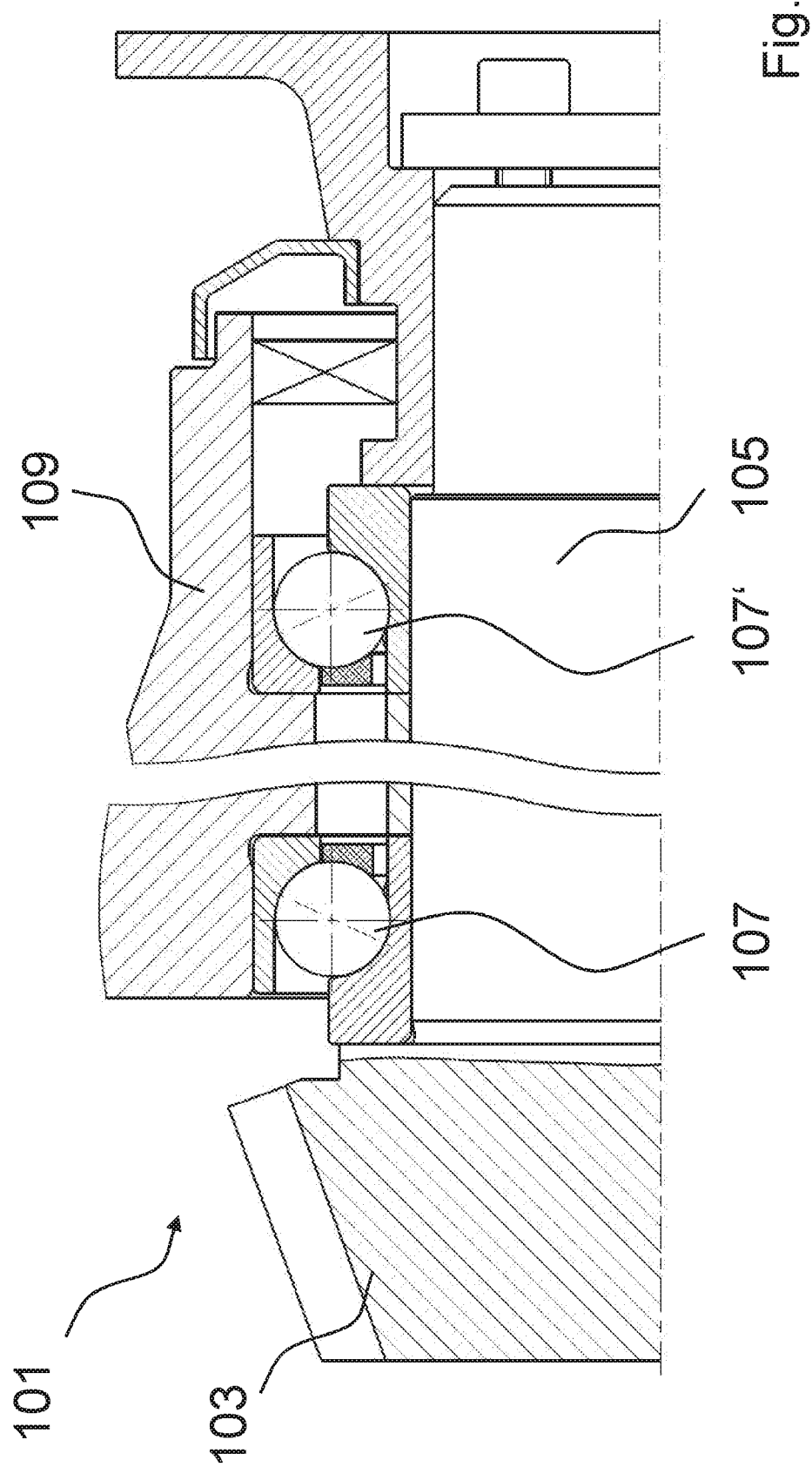
FIG. 3 shows a section of a transmission assembly according to an embodiment of the invention.

In FIG. 3 a part of a transmission assembly 101 is sectionally depicted. A drive pinion 103 is connected to a drive shaft 105, depicted here shortened, which is supported in a housing 109 via two angular contact ball bearings 107 and 107'. Due to the high loads, tapered roller bearings or double row angular contact ball bearings are typically currently used in such applications. In this application the angular contact ball bearing 107 lying closer to the drive pinion 103 is subjected to particularly high loads, which makes necessary a correspondingly high load rating C in the range of more than 30 kN in typical application cases. This cannot be achieved using known single row angular contact ball bearings. Therefore the angular contact ball bearings 107 and 107' are embodied according to the embodiment depicted in FIG. 1 and accordingly suitable for this application.

Preferably the angular contact ball bearings 107 and 107' are dimensioned with respect to their outer dimensions such that they are suitable for replacing existing double row angular contact ball bearings or tapered roller bearings in already existing transmission assemblies. This is illustrated in FIG. 3 by the inner rings of the angular contact ball bearings 107 and 107' being axially wide enough such that they fit into a receptacle of a previously used tapered roller bearing or double row angular contact ball bearing and can replace them without effort. Thus a reduction can be achieved therein of the friction by relatively simple replacing of the bearing, for example, in the case of service. The design of the angular contact ball bearings 107 and 107' allows this due to the thinly embodied inner and outer rings, the large balls, and the shoulder embodied axially wide.

Angular contact ball bearings according to the disclosure can also be used analogously in newly designed applications. Here an axially narrower design of the inner rings is also possible, which approximately corresponds to the axial width of the outer ring. Thus angular contact ball bearings according to the disclosure can be used in numerous applications and correspondingly flexibly designed.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved angular contact ball bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Angular contact ball bearing
3 Outer ring
5 Inner ring
7 Balls
9 Cage
11 Elevation
13,17 Shoulder
15, 19 Raceway
31 Guide structure
101 Transmission assembly
103 Drive pinion
105 Drive shaft

What is claimed is:

1. An angular contact ball bearing, comprising:
an outer ring having an outer diameter D and having a first rolling surface, wherein the outer ring has first and second outer ring axial ends, a portion of the outer ring forming an outer ring shoulder which projects radially inwardly and forms a portion of the first rolling surface, a radially inner end of the outer ring shoulder forming a first axially extending radial surface having a first axial width,
an inner ring having an inner diameter d and having a second rolling surface, wherein the inner ring has first and second inner ring axial ends, the inner ring forms an inner ring shoulder which projects radially outwardly and forms a portion of the second rolling surface, a radially outer end of the inner ring shoulder forming a second axially extending radial surface having a second axial width, wherein the second axial width is greater than the first axial width, the second rolling surface being curvilinear along a side of the inner ring shoulder,
no more than one row of balls disposed between the first rolling surface and the second rolling surface, each of the balls having a diameter $D_w$,
wherein the diameter $D_w$ of the balls, the outer diameter D of the outer ring, and the inner diameter d of the inner ring are chosen such that they satisfy the relationship:

$$D_w > 0.7 * \frac{(D-d)}{2}$$

a cage having a plurality of pockets formed by claw like extensions which extend essentially in the axial direction, each of the balls being in one of the plurality of pockets and having first and second axial ends, wherein the diameter of the balls, and the inner ring shoulder are configured such that the cage axially overlaps the first axial end of each of the balls, the inner ring shoulder axially overlaps the second axial end of each of the balls.

2. The angular contact ball bearing according to claim 1, wherein the outer ring shoulder has a minimum diameter $D_1$, wherein the first rolling surface has a diameter $D_2$ at a base of the first rolling surface, and wherein a ratio of $D_1$ to $D_2$ is between 0.85 and 0.91.

3. The angular contact ball bearing according to claim 2, wherein the inner ring shoulder has a maximum diameter $d_1$, wherein a reciprocal ratio of $d_1$ to a diameter $d_2$ of a raceway base of the second rolling surface is between 0.79 and 0.85.

4. The angular contact ball bearing according to claim 3, wherein a minimum axial width of the inner ring shoulder is wider than a maximum axial width of the outer ring shoulder.

5. The angular contact ball bearing according to claim 4, wherein a number Z of balls, where $$Z = \left( \frac{180}{\arcsin \frac{D_w}{D_{pW}}} \right) - 1$$

is disposed between the inner ring and the outer ring, where $D_{pW}$ indicates a pitch circle diameter of the angular contact ball bearing and Z is rounded to a whole number, and wherein a pressure angle of the angular contact ball bearing is between fifteen degrees (15°) and thirty-five degrees (35°).

6. The angular contact ball bearing according to claim 1, wherein a number Z of balls, where $$Z = \left( \frac{180}{\arcsin \frac{D_w}{D_{pW}}} \right) - 1$$

is disposed between the inner ring and the outer ring, where $D_{pW}$ indicates a pitch circle diameter of the angular contact ball bearing and Z is rounded to a whole number.

7. The angular contact ball bearing according to claim 1, wherein a pressure angle of the angular contact ball bearing is between fifteen degrees (15°) and thirty-five degrees (35°).

8. The angular contact ball bearing according to claim 1, wherein the second rolling surface includes an elevation directed radially outward and axially opposite the outer ring shoulder, the elevation being configured to cooperate with the outer ring shoulder and the cage such that the balls are captively retained on the inner ring.

9. The angular contact ball bearing according to claim 1, wherein the first rolling surface has a first cylindrical portion and a second portion curving away from the first cylindrical portion toward the inner ring and wherein the second rolling surface has a first cylindrical portion and a second portion curving away from the first cylindrical portion of the second rolling surface toward the outer ring and wherein the balls contact the first cylindrical portion of the first rolling surface and the second portion of the first rolling surface and the first cylindrical portion of the second rolling surface and the second portion of the second rolling surface.

10. The angular contact ball bearing according to claim 1, wherein the first outer ring axial end and the first inner ring axial end are axially aligned, wherein the inner ring shoulder extends axially outwardly past the second outer ring axial end.

11. The angular contact ball bearing according to claim 1, the angular contact ball bearing being free of any other rolling bearings aside from the no more than one row of balls.

12. The angular contact ball bearing according to claim 1, wherein the second rolling surface contacts each of the balls along an outer surface thereof from a radial bottom of the balls to a second axial end of the balls.

13. The angular contact ball bearing according to claim 12, wherein the second rolling surface extends radially outwardly past the second axial end of the balls.

14. The angular contact ball bearing according to claim 13, wherein the cage does not fully encircle the balls such that each pocket has an open axial side through which a portion of the balls protrude.

15. A transmission assembly for a motor vehicle including:
a housing;
a shaft having a gear element rotatably supported in the housing via at least two axially spaced angular contact ball bearings according to claim 1.

16. The transmission assembly according to claim 15, wherein the at least two angular contact ball bearings are identical and set in back-to-back arrangement with respect to each other.

* * * * *